United States Patent [19]
Marotta

[11] 3,711,419
[45] Jan. 16, 1973

[54] PROCESS FOR PREPARING SILICA AQUASOLS

[75] Inventor: Ralph Marotta, St. Louis, Mo.

[73] Assignee: Monsanto Company, St. Louis, Mo.

[22] Filed: July 2, 1970

[21] Appl. No.: 52,132

[52] U.S. Cl. ............. 252/313 S, 106/38.3, 106/286, 106/287 S
[51] Int. Cl. ....................... B01j 13/00, C01b 33/14
[58] Field of Search .................................. 252/313 S

[56] References Cited

UNITED STATES PATENTS

| | | | |
|---|---|---|---|
| 3,029,151 | 4/1962 | Reuter et al. | 252/313 X |
| 3,342,748 | 9/1967 | Marotta | 252/313 |
| 3,502,593 | 3/1970 | Mindick | 252/313 |

Primary Examiner—Richard D. Lovering
Attorney—Herbert B. Roberts, Roy J. Klostermann and Neal E. Willis

[57] ABSTRACT

A process for preparing stable, essentially transparent alkaline silica aquasols having an average particle diameter of 5 to 10 millimicrons by adding an acidic silica sol to a dilute alkali metal silicate solution. The acidic silica sol is gradually added over a period of 4 to 8 hours such that not more than 25 weight percent of the acidic sol is added during any one hour period. At least 25 weight percent of the acidic sol is added while the temperature is maintained within a range of about 25° C. to about 50° C., at least about 7 weight percent to about 30 weight percent is added while the temperature is maintained within a range of about 50° C. to about 90° C. and the balance is added while the temperature is maintained within a range of about 70° C. to about 100° C. The last step is that of concentrating by evaporation of water.

5 Claims, No Drawings

3,711,419

PROCESS FOR PREPARING SILICA AQUASOLS

BACKGROUND OF THE INVENTION

Field of the Invention

This invention relates to a process for preparing stable alkaline silica aquasols having an average particle diameter of 5 to 10 millimicrons and a silica concentration of about 19 weight percent to about 36 weight percent.

Alkaline silica sols having 5 to 10 millimicrons particle size are especially useful as mold binder in the investment casting industry. Also, they are used for the treatment of rugs to prevent soiling which depend upon the fact that particles of colloidal silica can be deposited upon the fibers without undue whitening whereby it is possible to remove soil very readily by vacuuming. They are also used as reinforcing agents for foam rubber.

In U.S. Pat. No. 3,502,593 is disclosed a process for preparing silica aquasols having particle diameter of 5 to 10 millimicrons which employs vacuum. However, the use of vacuum requires special equipment, special attention by operators and creates potential safety hazards, which generally makes the process more expensive. Therefore, a process which produces an aquasol having an average particle diameter of 5 to 10 millimicrons and which is operated at atmospheric pressure would be an advancement in the art.

BRIEF DESCRIPTION OF THE INVENTION

Briefly, in accordance with this invention, stable alkaline aquasols having a silica concentration of about 19 weight percent to about 36 weight percent and an average silica particle diameter of about 5 to 10 millimicrons are prepared with none of the aforementioned disadvantages by adding an acidic silica sol to a dilute alkali metal silicate solution under conditions hereinafter set forth, and thereafter concentrating until the stable alkaline aquasols are obtained. The invention will be understood from the following detailed description of the invention.

DETAILED DESCRIPTION OF THE INVENTION

In the process of this invention, a dilute aqueous solution of an alkali metal silicate is utilized. The alkali metal silicates that may be used include, for example, sodium and potassium silicates, having an $SiO_2:M_2O$ ratio within the range of 1:1 to about 3.6:1 wherein M is an alkali metal cation, the preferred alkali metal silicate is sodium silicate particularly a sodium silicate having an $SiO_2:Na_2O$ mole ratio in the range of 2.5:1 to about 3.5:1 more particularly a molar ratio within the range of 3.0:1 to about 3.4:1. The concentration of the $SiO_2$ in the dilute aqueous alkali metal silicate is from about 1 weight percent to about 7 weight percent based on the total weight of the alkali metal silicate solution. The amount of alkali metal silicate in said solution should be sufficient to provide the stable alkaline aqueous silica sols with a pH of about 8.8 to 10.5 at 25° C.

Another ingredient used in the process of the present invention is an acidic silica sol. Such a sol should have a pH of below about 4, preferably from about 2 to about 3.5, a silica particle diameter of less than about 2 millimicrons and a silica concentration of about 2 weight percent to about 14 weight percent, based on the total weight of the acidic silica sol.

Suitable acidic silica sols include silica aquasols produced as described in the Bird patent, U.S. Pat. No. 2,244,325. According to the Bird method, a water glass (alkaline silicate solution) is passed through a column of (acid activated) cation exchange material in the hydrogen form whereby the alkali metal of the water glass is exchanged for hydrogen and the resultant product is a silica sol of relatively high purity, although it does contain some quantities of chloride and sulfate anions present in the water glass. In the Bird patent, it is shown that the aquasols produced thereby may be conveniently concentrated by evaporation to silica concentrations as high as 15 percent silica. Other suitable acidic silica sols include an acidic silica hydro-organosol containing a substantially neutral water miscible organic liquid having a boiling point below that of water at atmospheric pressure, about 4 percent to about 12 percent by weight of silica as silicic acid and from about 0.01 percent to about 0.01 percent by weight of water soluble mineral acid salts such as water soluble metal chlorides, sulfates, nitrates, phosphates, carbonates and the like. The metal moiety of such salts may be an alkali metal such as, for example, lithium, sodium, potassium, cesium, or alkaline earth metal such as calcium or magnesium. HOwever, alkali metal salts have been found to be advantageous and alkali metal chlorides and sulfates have been found to be especially advantageous.

The acidic silica hydro-organosol employed may be prepared in a variety of ways, for example, by processes similar to those described in the U.S. Pat. No. 2,285,477 to John F. White, patented June 9, 1942, or U.S. Pat. No. 2,285,449 to Morris D. Marshall, patented July 9, 1942. The processes of these patents comprise, in general, first forming an acidic sol having a pH of between 1.8 and 4.0 by acidifying a water soluble alkali metal silicate such as sodium silicate with a mineral acid such as sulfuric acid in the proper proportions to give such a pH, and then adding a water miscible organic liquid such as ethanol to the resulting aquasol precipitate, a substantial amount of the salt formed by the reaction of the silicate and the acid as in the above noted Marshall patent, or the resulting hydro-organosol may be cooled to precipitate further quantities of the salt as in the above White patent. The precipitated salt is then separated from the sol by any suitable separation procedure such as filtration, centrifugation and the like to form sols containing from about 0.05 to 0.4 percent, preferably 0.075 to 0.2 percent by weight of a salt such as, for example, sodium sulfate or sodium chloride.

These hydro-organosols are usually prepared at temperatures between −20° C and +15° C but are preferably prepared at a temperature between −10° C and +10° C and generally contain 0.075 to 0.2 percent by weight of salt at the preferred temperatures. The hydro-organosols preferably have a pH between 2.5 and 3 and an $SiO_2$ content as silicic acid of from about 5 to 12 percent, preferably 8 to 10.5 percent by weight.

A preferred procedure for preparing acidic silica hydro-organosols of the type referred to in the preceeding paragraph comprises first reacting an aqueous solution of sodium silicate and aqueous sulfuric acid at a temperature between about 0° C and 15° C in such proportions and concentrations to provide an acidic silica aquasol having a pH of about 2 to 4 and containing sodium sulfate and from about 12 to 20 percent by weight of $SiO_2$ as silicic acid. The acidic aquasols having a silica content over 17 percent by weight, generally must be kept at from 0° to 5° C to prevent rapid gelation. The acidic silica aquasol thus obtained is maintained at a temperature of above 0° to 15° C and a substantially neutral water miscible organic liquid having a boiling point below that of water at atmospheric pressure, for example, a liquid such as ethanol is mixed therewith to form a silica hydro-organosol containing from about 25 to 60 percent by weight, preferably 40 to 60 percent by weight of the organic liquid and from about 5 to 11 percent by weight of $SiO_2$ as silicic acid. The sodium sulfate is only partially soluble in such sol and a substantial portion is precipitated as $$Na_2SO_4.b1.10H_2O$$

On removal of this precipitated sodium sulfate by centrifugation, decantation or filtration of the sol or the like, a sol is obtained which contains from about 0.05 to 0.4 percent of sodium sulfate depending on the concentration of the organic liquid in the sol and the temperature of the sol. It is usually not possible to reduce the sodium sulfate content of the sol appreciably below 0.075 percent by weight by increasing the organic liquid concentration or by cooling the sol to a temperature just above the freezing point of the sol or by using both of these procedures, although some reduction in sodium sulfate content can be obtained under these circumstances. The water miscible organic liquids employed in preparing the above sols preferably consist of carbon, hydrogen and oxygen atoms, and are substantially neutral. Examples of suitable liquids which may be used include methanol, ethanol, isopropanol, tertiary butyl alcohol, acetone, methylethyl ketone and the like.

Another preferred procedure for preparing an acidic silica-hydro-organosols is described in U.S. Pat. No. 3,342,748 which is incorporated herein by reference.

In accordance with this invention, the acidic silica sol is gradually added to the dilute aqueous alkali metal silicate solution over a period of 4 to 8 hours such that not more than 25 weight percent of the acidic sol is added during any 1 hour period. At least 25 weight percent of the acidic sol is added while the temperature is maintained within a range of about 25° C to about 50° C, at least about 7 weight percent to about 30 weight percent is added while the temperature is maintained within a range of about 50° C to about 90° C and the balance is added while the temperature is maintined within a range of about 70° C to about 100° C. One of the reasons for adding the acidic sol in this manner is to bring about massive nucleation of the silica particles at lower temperatures onto which subsequent small particle diameter silica accretes. Addition of smaller proportions of acidic silica sol for nucleation generally leads to average silica particle diameters in excess of 10 microns. Addition of larger proportions of acidic silica sol for nucleation results in sols which are generally unstable.

After the total amount of acidic silica sol has been added, the mixture is concentrated by evaporation of the water until a silica concentration of about 19 weight percent to about 36 weight percent is obtained. Such concentration may be accomplished by boiling at atmospheric pressure; however, subatmospheric pressures may be utilized, and consequently lower temperatures employed.

The silica aquasol obtained in accordance with this invention has the following characteristics: (1) a silica concentration of about 19 weight percent to about 31 weight percent, based on the total weight of the silica aquasol; (2) a pH of about 8.8 to about 10.5 at 25° C as determined utilizing a glass electrode; (3) an average particle diameter of about 5 to 10 millimicrons, as determined using an electron microscope; (4) particles that are essentially spherical; (5) a viscosity of below 18 centipoises at 25° C as determined by Brookfield viscometer, No. 1 spindle rotating at 60 rpm on a 250 ml sample having a silica concentration of 19 to 36 weight percent; (6) a specific conductance of about 3,500 to 5,500 micromhos as measured at about 19 to 36 weight percent $SiO_2$ at 28° C in accordance with conventional procedures; (7) a silica molecular weight of 86,000 to 690,000 as determined by light scattering; (8) essentially transparent (light transmissive of 40 to 100 percent, utilizing an electro-photometer on a 23 ml sample); (9) a water soluble alkali metal salt of a mineral acid, in an amount of 0.07 weight percent to about 0.25 weight percent, based on the total weight of the aquasol, equivalent to 0.056 weight percent to about 0.20 weight percent of $NaSO_4$ in the aquasol; and (10) an amount of water soluble salt consisting of a metal cation and a silica oxide containing an amount to provide a pH of 8.8 to 10.5 at 25° C. The distance between the silica particles is generally 3.8 millimicrons or greater. These silica aquasols are especially useful as reinforcing agents in foam rubber and binders for ceramics.

To more fully illustrate the subject invention, the following detailed examples are presented. All parts, percentages and proportions are by weight unless otherwise indicated.

EXAMPLE I

A stainless steel vessel equipped with a stirrer, a condenser to recover solvents and an external steam heated multitube heat exchanger may be used in accordance with this invention. During the operation, a portion of the reaction is continuously recirculated by withdrawing it from the reactor bottom pumped through a heat exchanger and released above the batch level. A charge of 380 gallons of a hydro-organosol at pH 3 containing 0.028 weight percent of sodium sulfate and 10 weight percent of $SiO_2$ based on the total weight of the hydro-organosol, and having a particle diameter of about 1.8 millimicrons prepared in accordance with the teachings of U.S. Pat. No. 3,342,748 is added at a rate of 1 gallon per minute into the reactor which already contains 140 gallons of dilute sodium silicate equivalent to about 1.9 weight percent $SiO_2$ based on the total weight of the dilute sodium silicate solution. The first 95 gallons of the above mentioned hydro-organosol, approximately 25 weight percent of the total charge, is added at the same rate and the temperature increased from 35° to 49° C. The next 31 gallons, approximately 8 weight percent of the charge, is added at the same rate and the temperature is increased from 49° to 85° C. The remainder of the hydro-organosol is then added at the same rate. Total time for addition is 6

½ hours. The solution is then concentrated to an aqueous sol containing about 30.5 percent silica. The stable alkaline silica sol has an average particle diameter of 8 millimicrons, a viscosity of below 18 centipoises at 25° C, a silica molecular weight of about 353,000, a pH of 9.9, a light transmission of 80 percent, and specific conductance was 4,800 micromhos.

The above procedure was followed and a stable alkaline silica sol was obtained having the above mentioned physical characteristics.

EXAMPLE II

The procedure of Example I is repeated with the exception that in place of sodium silicate in the same equivalent amount is added potassium silicate. Another run is made following the procedures of Example I with the exception that in place of the potassium silicate in the same equivalent amount is added lithium silicate. Likewise, in another run, the procedure of Example I is followed with the exception that in place of the hydro-organosol is added a silica aquasol in the following amount: 543 gallons of 7 percent silica is added at a rate of 1.43 gallons per minute over a period of 6 ⅓ hours. One hundred and thirty-six gallons are added from 35° to 49° C, 45 gallons from 49° to 85° C and then the remainder. The solution is then concentrated to a stable 30.5 percent silica aquasol.

EXAMPLE III

The procedure of Example I is followed with the exception that 45 weight percent of the total charge of the silica aquasol is added as the temperature is increased from 35° to 49° C and 8 weight percent of the total charge is added as the temperature is increased from 49° to 84° C. The mixture is concentrated to a silica concentration of 19.3 weight percent and the silica size is an average of 5 millimicrons and a molecular weight of about 86,000.

What is claimed is:

1. A process for preparing a stable alkaline silica aquasol of about 19 weight percent to about 36 weight percent of silica, based on the weight of said silica aquasol and having an average silica particle diameter of about 5 to 10 millimicrons which comprises (1) gradually adding to (a) a dilute aqueous alkali metal silicate solution, said solution having a silica content of about 1 weight percent to about 7 weight percent, based on the weight of the alkali metal silicate solution, having sufficient alkali metal oxide present to provide said alkaline silica aquasol with a pH of about 8.8 to about 10.5 at 25° C and having a temperature of about 25° C to about 35° C; (b) an acidic silica sol selected from the group consisting of silica aquasols and silica hydro-organosols, said silica sol having a pH below about 4, a silica particle diameter less than about 2 millimicrons and a silica concentration of about 2 weight percent to about 14 weight percent, based on the weight of said acidic silica sol; over a period of about 4 to about 8 hours, such that not more than 25 weight percent of the acidic sol, based on the total weight of the acidic sol, is added during any one hour period, with at least 25 weight percent of the acidic sol, based on the total weight of the acidic sol, being added while maintaining the temperature within a range of about 25° C to about 50° C, with at least 7 weight percent to about 30 weight percent of the acidic sol, based on the total weight of the sol being added while maintaining the temperature within a range of about 50° C to about 90° C and with the balance of the acidic sol being added while maintaining the temperature within a range of 70° to 100° C, (2) concentrating under conditions of temperature and pressure such that the water is continuously evaporated whereby a stable essentially transparent alkaline silica aquasol is obtained having about 19 weight percent to about 36 weight percent of silica, based on the total weight of the silica aquasol, a pH of about 8.8 to about 10.5 and a silica particle diameter of about 5 millimicrons to about 10 millimicrons.

2. A process according to claim 1 wherein said alkali metal silicate is sodium silicate.

3. A process according to claim 2 wherein said acidic silica sol is a silica hydro-organosol, having a silica concentration of about 11 weight percent and containing about 44.5 percent water and about 44.5 weight percent ethanol.

4. A process according to claim 3 wherein at least 25 weight percent of the acidic sol based on the total weight of the sol is added while the temperature is maintained within the range of about 25° C to about 50° C, and wherein about 7 weight percent to about 30 weight percent based on the weight of the sol is added while the temperature is maintained within the range of 50° C to about 90° C.

5. A process according to claim 1, wherein a recirculating heat exchanger is utilized.

* * * * *